United States Patent [19]

McDole

[11] 4,411,353
[45] Oct. 25, 1983

[54] GLASSWARE TRANSFER

[75] Inventor: Lawrence K. McDole, Brockway, Pa.

[73] Assignee: Brockway Glass Co., Inc., Brockway, Pa.

[21] Appl. No.: 233,164

[22] Filed: Feb. 10, 1981

[51] Int. Cl.³ .............................................. B65G 47/26
[52] U.S. Cl. ..................................... 198/425; 198/457
[58] Field of Search ......................... 198/457, 459, 425

[56] References Cited

U.S. PATENT DOCUMENTS

| 3,365,857 | 1/1968 | Liedtke | 198/459 |
| 3,701,407 | 10/1972 | Kulig | 198/457 |
| 3,827,211 | 8/1974 | Zavatone | 198/425 |
| 3,902,587 | 9/1975 | Checcucci | 198/459 |
| 4,227,606 | 10/1980 | Bogatzki | 198/459 |

Primary Examiner—Jeffrey V. Nase
Attorney, Agent, or Firm—Burns, Doane, Swecker & Mathis

[57] ABSTRACT

An improved glassware transfer method and apparatus includes a plurality of pushing members provided on an endless carrier with a spacing between a leading pushing member and a trailing pushing member greater than a spacing between other adjacent pushing members. Preferably, the leading pushing member is positioned closer to the next following pushing member and angled outwardly with respect to the endless carrier. The leading pushing member is preferably positioned closer to the adjacent pushing member in the machine direction.

9 Claims, 7 Drawing Figures

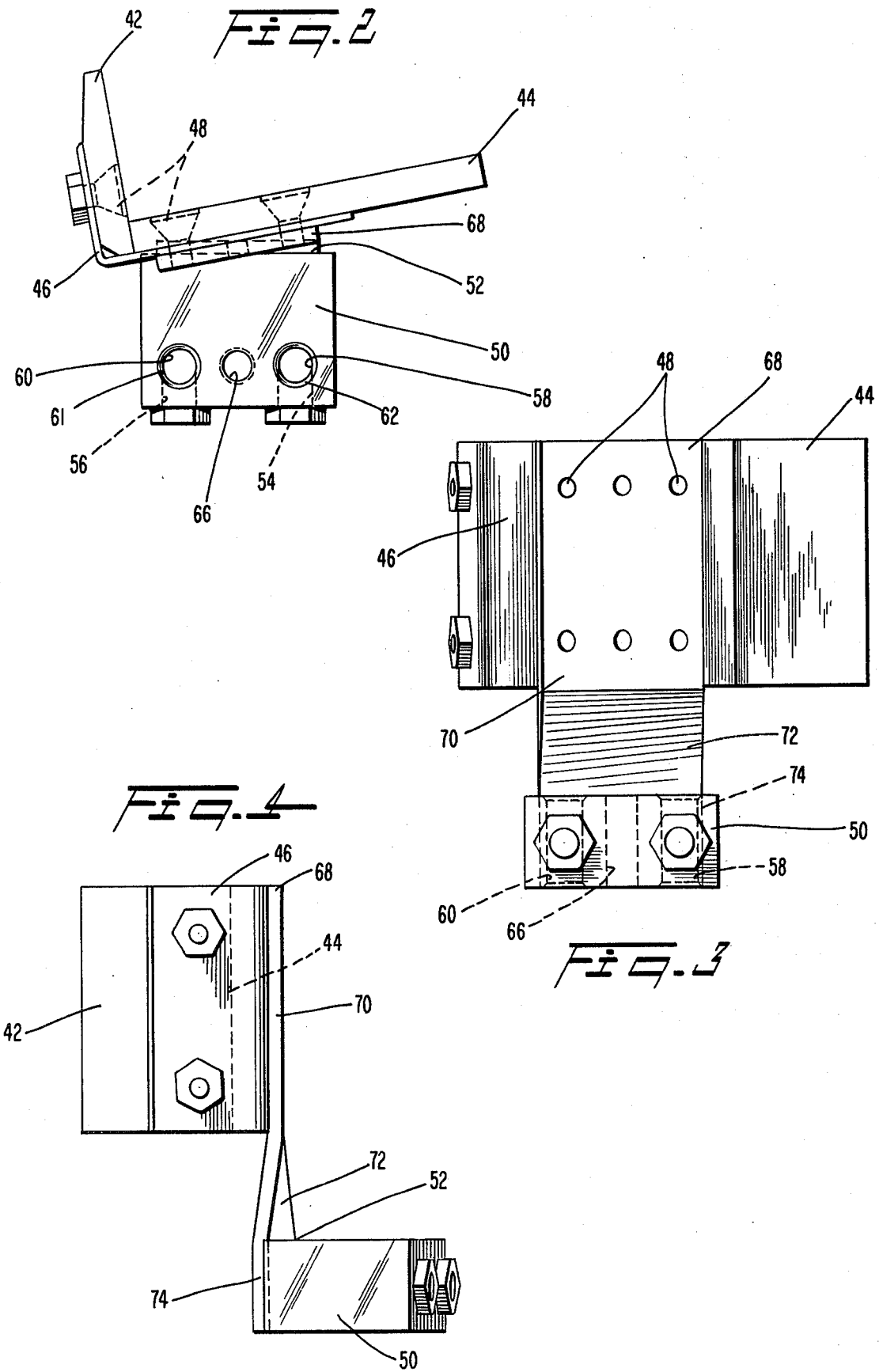

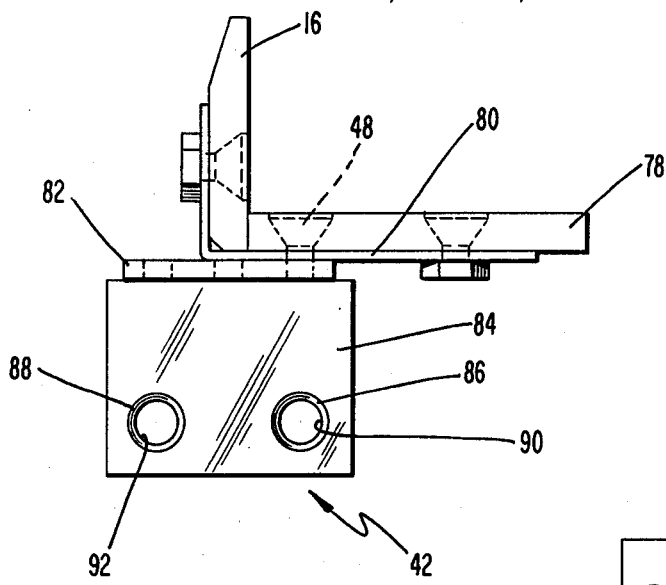
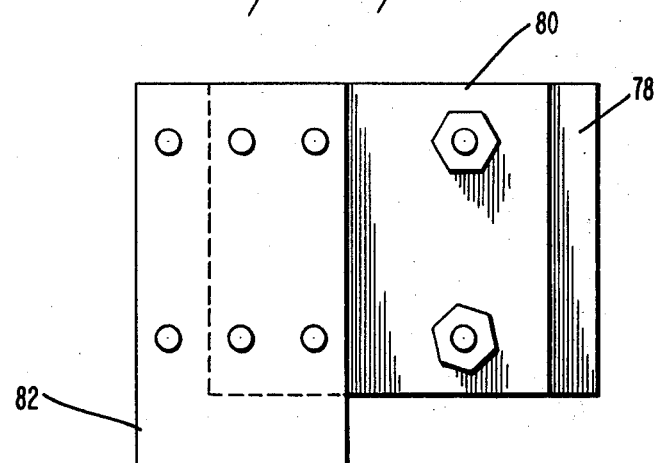
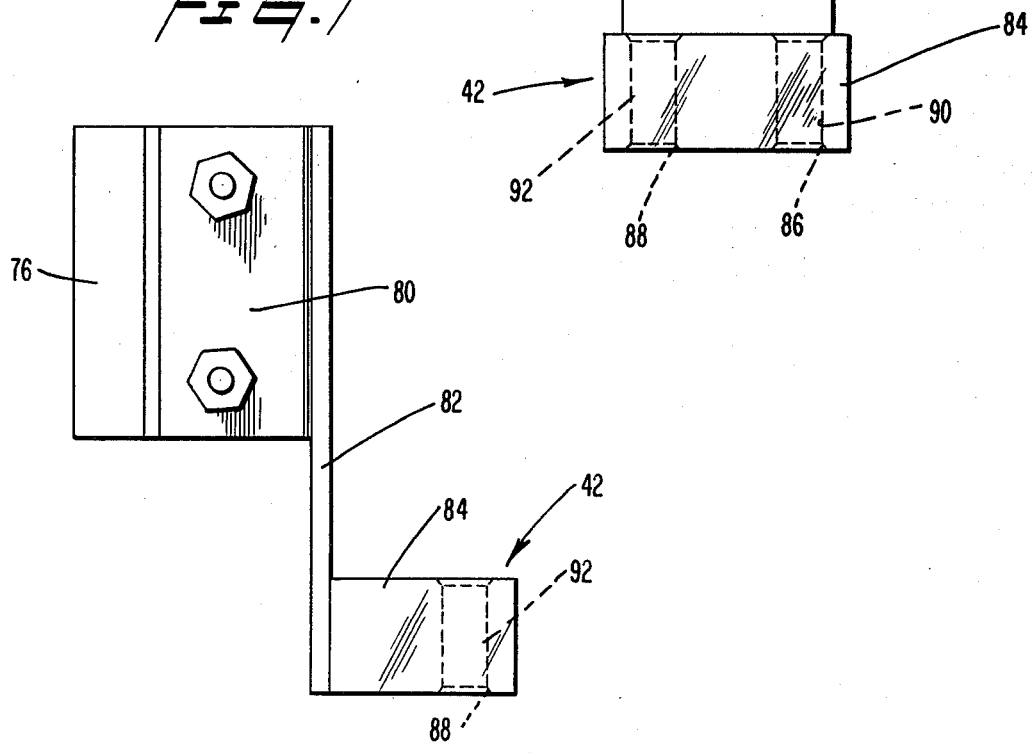

GLASSWARE TRANSFER

BACKGROUND AND SUMMARY OF THE PRESENT INVENTION

The present invention relates generally to article transfer arrangements and more particularly relates to glassware transfer from a first conveyor onto a second conveyor oriented generally perpendicularly to the first conveyor.

Various arrangements are known for transferring a series of equally spaced articles from a first conveyor onto a second conveyor oriented generally perpendicularly with respect to the first conveyor. U.S. Pat. No. 3,701,407 of Kulig issued on Oct. 31, 1972 discloses a glassware transfer mechanism wherein an endless carrier chain travels about first and second sprockets provided on either side of the first conveyor. The endless carrier chain includes a plurality of pusher members equally spaced from one another. Each pusher member includes a first wall oriented generally perpendicular to the endless carrier chain and a second wall oriented generally parallel to the endless carrier chain with the first and second walls oriented perpendicularly with respect to one another. The pusher members sequentially engage the series of articles on the first conveyor and transfer the articles onto the second conveyor by way of a fixed guide bar which releases the articles from the pusher members of the endless carrier. In Kulig, the equal spacing of the adjacent pusher members results in an equal spacing between the adjacent articles on the second conveyor.

It is customary in glassware production facilities to transfer newly formed glassware from a first conveyor onto a second conveyor oriented generally perpendicular to the first conveyor. While on the second conveyor, a series of the newly formed glassware articles is typically engaged by a stacker bar which advances the series of newly formed articles from the second conveyor onto a lehr mat for heat treating.

As production speeds of glassware forming machinery increase, the use of a conventional transfer mechanism and stacker bar with a continuous series of equally spaced glassware articles is unacceptable since a trailing edge of the stacker bar inadvertently engages a leading glassware article of the next series on the continuously advancing second conveyor. In this way, the stacker bar oftentimes knocks the leading glassware article off of the second conveyor disrupting the smooth flow of glassware articles into the lehr.

Accordingly, it is an object of the present invention to provide an article transfer mechanism which overcomes the disadvantages of the known prior art.

It is another object of the present invention to provide an article transfer mechanism which provides an increased spacing between leading and trailing articles on a conveyor.

Still another object of the present invention is to provide a glassware transfer mechanism for transferring a series of equally spaced articles from a first conveyor onto a second conveyor with an increased spacing provided between adjacent series of a predetermined number of articles.

Still further, it is an object of the present invention to provide a glassware transfer mechanism which permits a stacker bar to remove a series of articles from a conveyor without disrupting the next series of articles on the conveyor.

These and other objects of the present invention will become obvious from a reading of the detailed specification in conjunction with the accompanying drawings.

In the apparatus according to the present invention, a series of generally equally spaced articles are transferred from a first conveyor onto a second conveyor oriented generally perpendicularly to the first conveyor. An endless carrier includes a plurality of equally spaced pusher members with the endless carrier also including at least two pusher members spaced apart a predetermined distance which is greater than the spacing of the equally spaced pusher members. Preferably, the endless carrier includes a chain which is carried by at least two sprockets provided on either side of the first conveyor and with at least two pairs of pusher members of the endless carrier being spaced apart a predetermined distance which is less than the spacing of the equally spaced pusher members. Preferably, each of the plurality of equally spaced pusher members is oriented at a first predetermined angle with respect to the endless carrier with at least one of the pusher members oriented at a second (different) predetermined angle with respect to the endless carrier. Each of the plurality of equally spaced pusher members preferably includes a first wall oriented generally perpendicular to a machine direction of the endless carrier and a second wall oriented generally parallel to a machine direction of the endless carrier. The two pusher members which are spaced apart a predetermined distance greater than the spacing of the equally spaced pusher members preferably define a leading pusher member and a trailing pusher member which are spaced apart from adjacent ones of said equally spaced pusher members by distances less than the spacing of said equally spaced pusher members.

BRIEF DESCRIPTION OF THE DRAWINGS

A preferred embodiment of the present invention will be described with reference to the accompanying drawings wherein like members bear like reference numerals and wherein:

FIG. 2 is a bottom view of the leading pusher member of FIG. 1;

FIG. 3 is a side view of the leading pusher member of FIG. 2;

FIG. 4 is an end view of the leading pusher member of FIG. 2;

FIG. 5 is a bottom view of the trailing pusher member of FIG. 1;

FIG. 6 is a side view of the trailing pusher member of FIG. 5; and

FIG. 7 is an end view of the trailing pusher member of FIG. 5.

DETAILED DESCRIPTION OF THE PREFERRED EMBODIMENT

Figure 1:
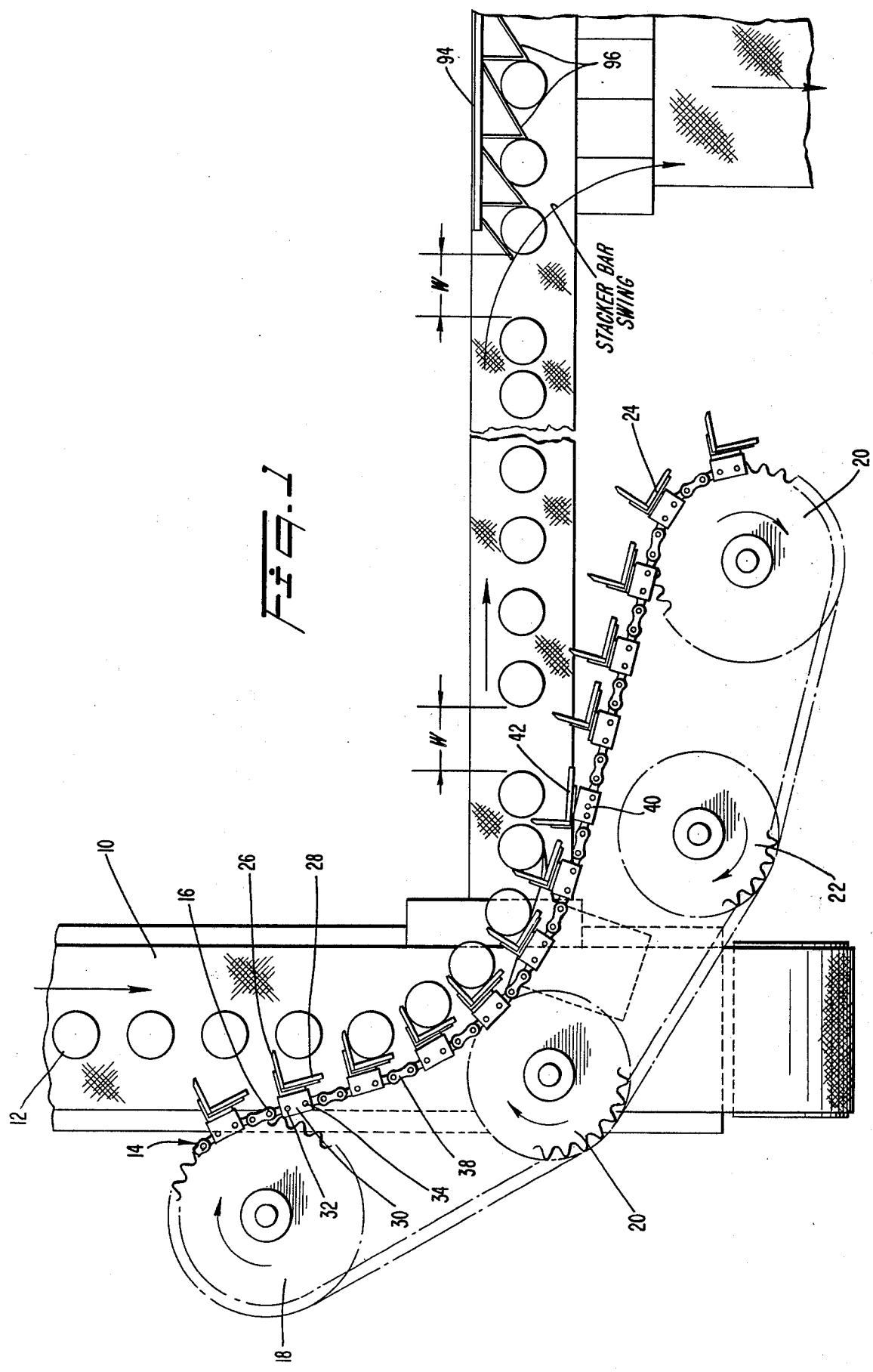
FIG. 1 is a top view of an article transfer mechanism according to the present invention for transferring articles from a first conveyor onto a second conveyor oriented generally perpendicular to the first conveyor.

With reference now to FIG. 1, an improved article transfer arrangement according to the present invention will be described with reference to glassware article production wherein a first conveyor 10 advances a series of newly formed glassware articles 12 toward an endless carrier 14. The newly formed articles 12 are generally equally spaced apart from one another and may preferably be produced by a Hartford I.S. type of glassware forming machine.

The endless carrier 14 includes a chain 16 which travels about first and second sprockets 18, 20 provided on either side of the first conveyor 10. As necessary, additional sprockets 21, 22 may be provided between the first and second sprockets 18, 20 so as to maintain a preferred configuration for the chain 16. The first sprocket 18 is preferably driven so as to advance the chain 16 in a machine direction with the remaining sprockets free wheeling. The endless carrier 14 includes a plurality of pusher members 24 which are equally spaced apart from one another by a predetermined distance.

The endless chain 16 includes a plurality of links 38 which are pivotably joined to one another by intermediate links 39 in a conventional manner. Alternate ones of said links 38 are located beneath an associated pusher member 24 with each of the alternate ones of the links 38 being provided with elongate pins which both pivotably join the link 38 with the intermediate links 39 and extend vertically upwardly from the link 38. In this way, the upwardly extending pins receive the pusher members 24 in a conventional manner.

A glassware transfer mechanism, according to the prior art, is disclosed in U.S. Pat. No. 3,701,407 with equally spaced pusher members provided throughout the entire endless carrier. U.S. Pat. No. 3,701,407 is hereby incorporated by reference for its teaching of the construction and operation of a glassware transfer mechanism as in the present invention but having an equal spacing between each of the adjacent pusher members 24.

As the articles 12 are carried by the first conveyor toward the endless carrier, a first wall 26 of one of the pusher members 24 engages one of the articles and advances with respect thereto until the article 12 is securely held between the first wall 26 and a second wall 28 of the pusher member 24. As the engaged articles advance on the first conveyor, they are urged sideways towards a second conveyor 11. At an appropriate location, a fixed guide bar 13 urges the articles out of engagement with the endless carrier and onto the second conveyor 11. Various guide rollers and other mechanisms (not shown) may be provided in a manner known to those skilled in the art to maintain the endless carrier in a preferred path of travel.

Preferably, the first wall 26 and the second wall 28 are oriented perpendicularly with respect to one another with the first wall 26 being generally perpendicular to the endless conveyor and the second wall 28 being generally parallel with respect to the endless carrier. As desired, the first and second walls 26, 28 may be provided with impact absorbing material and with heat resistant material so as to facilitate engagement with the newly formed glassware articles 12. The first and second walls 26, 28 of each of the pusher members 24 are carried by an inverted L-shaped bracket and a link member 30 having a pair of holes 32, 34. The holes 32, 34 are provided to facilitate connection of the L-shaped bracket and link member 30 with the associated link 38 (not shown) of the endless carrier by way of the first and second pins which extend upwardly into the holes 32, 34.

In this way, the pusher members 24 may be easily connected and disconnected from the endless carrier as desired.

According to the present invention, a leading pusher member 40 is spaced apart from a trailing pusher member 42 by a predetermined distance which is greater than the spacing between adjacent pusher members 24. Preferably, the leading pusher member 40 includes a first wall 41 (see FIG. 2) and a second wall 44 with the first wall 41 arranged generally perpendicular to the second wall 44. The first and second walls 41, 44 are fastened to an L-shaped bracket 46 by way of suitable fasteners such as machine screws 48 with the L-shaped bracket 46 fastened to a link member 50 by way of a plate 68. The L-shaped bracket 46 is connected to the link member 50 at an angle so that the first wall 41 and the second wall 44 are offset with respect to the endless carrier 14. Preferably, the angle between the second wall 44 and a leading edge 52 of the link member 50 is about ten degrees.

The first and second walls are angled with respect to the link member 50 by about ten degrees so as to more securely hold the article against the first wall 41. In this way, the increased spacing between the trailing and leading articles is more reliably provided. Without the angular offset of the leading pusher member, the article may have a tendency to frictionally engage the second wall 44 at a mid-section of the wall and thereby maintain the equal spacing between the articles as on the first conveyor.

So as to maintain the desired orientation of the leading pusher member 40 with respect to the endless carrier, a pair of machine screws 54, 56 are provided for engagement with pins 58, 60 of the associated link 38 (not shown) which pins pass through bores 61, 62 of the link member 50. Furthermore, an additional bore 66 may be provided between the bores 61, 62 to facilitate detection of the location of the leading pusher member by an optical sensor (not shown).

With reference of FIG. 3, the L-shaped bracket 46 is fastened to the plate 68 by way of six machine screws 48. The plate 68 includes a first generally planar section 70 and a second generally planar section 74 separated by a twist section 72. The first generally planar section 70 is twisted with respect to the second generally planar section 74 by ten degrees so as to provide the angular offset for the first and second walls 42, 44 relative to the link member 50.

The first and second walls are withdrawn by about one-half inch relative to the plate 68 as compared to the equally spaced pusher members 24. In this way, the spacing between the leading pusher member 40 and the immediately following pusher member 24 is less than the spacing between the equally spaced pusher member 24 by a predetermined amount of preferably one-half inch.

With reference to FIG. 4, the orientation of the generally flat portions 70, 74 relative to the twist portion 72 is illustrated.

With reference now to FIG. 5, the trailing pusher member 42 includes a first wall 76 and a second wall 78 which are oriented generally perpendicular with respect to one another. The first wall 76 is oriented perpendicular to the endless carrier 14 with the second wall 78 oriented generally parallel with respect to the endless carrier 14. The first and second walls 76, 78 are carried on an L-shaped bracket 80 which is fastened to a link member 84 by way of a flat plate 82. The link member 84 is provided with first and second bores 86, 88 which receive pins 90, 92 of the associated link 38 (not shown).

The trailing pusher member 42 is identical in construction to the conventional pusher members 24 (see FIG. 1) with the exception that the L-shaped member 80 and the associated first and second walls 76, 78 are advanced relative to the flat plate 82.

With reference to FIG. 6, the L-shaped bracket 80 is advanced one-half inch with respect to the flat plate 82 and is fastened to the flat plate 82 by way of machine screws 48. With reference to FIG. 7, the flat plate 82 is preferably not twisted and instead maintains the desired perpendicular relationship of the first wall 76 with respect to the endless carrier.

The first and second walls 41, 44, 76, 78 of the leading and trailing pusher members are preferably formed of a suitable, conventional material such as is known for the pusher members 24. Just as the L-shaped bracket and the first and second walls of the trailing member are advanced one-half inch relative to the link member 84, the L-shaped bracket and first and second walls of the leading pusher member are retarded one half-inch relative to the link member 50. In this way, the leading and trailing pusher members are separated by an additional one-inch in comparison with the spacing between adjacent pusher members 24. Similarly, the spacing between the trailing member 42 and the immediately adjacent pusher member 24 is reduced by one-half inch and the spacing between the leading pusher member 40 and the immediately following pusher member 24 is reduced by one-half inch.

With reference again to FIG. 1, the endless carrier preferably includes a predetermined number of pusher members corresponding to the number of pusher members forming one series of articles. For example, a conventional stacker bar for a glassware forming device accommodates 30 articles with the endless carrier preferably having 30 pusher members. In this way, the series of generally equally spaced articles 12 provided on the first conveyor will be divided into consecutive series each containing 30 articles with the spacing between the first and second articles and between the 29th and 30th articles being less than the spacing between the remaining articles of each series and with the spacing between the 30th article of a first series and the first article of a second series being larger than the spacing between intermediate articles of each series.

By providing the increased spacing between the trailing and leading articles of adjacent series, a stacker bar 94 having a series of spacers 96 may sequentially engage a series of articles without disrupting the first article of the next series of articles. Typically, the stacker bar swings in an arc having a component of velocity in the direction of the second conveyor and a component of velocity in a direction perpendicular to the direction of the second conveyor. Such a movement of the stacker bar is generally necessary whenever the second conveyor moves continuously. The slight decrease in spacing between the leading pair and the trailing pair of articles in each series is easily accommodated by the spacers of the stacker bar with the result that the articles are generally equally spaced when removed from the second conveyor.

The spacing between the adjacent pusher members depends of course on the size of the articles to be transferred and the initial spacing between adjacent articles. Therefore, although an increase of one inch in the spacing between the trailing and leading pusher members is generally sufficient to provide a suitable window for accommodating the stacker bar swing, a larger or smaller increase in the spacing between the trailing and leading paddles may be desirable. Furthermore, the endless carrier may be provided with a predetermined number of pusher members corresponding to a multiple series of articles. For example, if the stacker bar accommodates only ten articles, the endless carrier of FIG. 1 would be divided into three sets of ten pusher members with each set of ten pusher members defined by leading and trailing pusher members 40, 42. Alternatively, the endless carrier may be increased or decreased in length as desired to accommodate different stacker bar configurations or whenever the predetermined number of articles defining a series is changed.

In operation, a series of generally equally spaced articles such as newly formed glassware is conveyed on a first conveyor with a first one of said articles being engaged by a leading pusher member. The leading pusher member is preferably off-set about ten degrees with respect to the endless carrier so as to urge the engaged article against the rearward end of the pusher member. A plurality of the newly formed articles are then sequentially engaged by additional pusher members provided sequentially behind the leading pusher member on the endless carrier. The spacing between the plurality of pusher members is preferably identical to one another with the spacing between the leading pusher member and the immediately following pusher member being slightly less than the spacing between adjacent ones of said plurality of said pusher members. A trailing pusher member is preferably spaced closer to the immediately preceding pusher member and further apart from the immediately following (leading) pusher member so as to position the article engaged by the trailing pusher member slightly closer to the immediately preceding article and slightly further apart from the immediately following article. Each of the articles engaged by the pusher members are transferred from the first conveyor onto a second conveyor with the spacing between the articles on the second conveyor corresponding generally to the spacing between the adjacent pusher members of the endless carrier. In this way, an increased spacing is provided between the trailing and leading articles of a predetermined number of articles so as to define a window to facilitate engagement of the predetermined number of articles. Preferably, a stacker bar travelling in an arc having a component in the direction of the second conveyor and also in a direction perpendicular to the second conveyor repeatedly engages sequential series of articles carried by the second conveyor.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for transferring a series of generally equally spaced articles from a first conveyor onto a second conveyor oriented generally perpendicularly to the first conveyor, comprising:

endless carrier means for urging said articles from said first conveyor onto said second conveyor, said endless carrier means including a plurality of equally spaced pusher members, said endless carrier means also including at least two pusher members spaced apart a predetermined distance which is greater than the spacing of said equally spaced pusher members such that two of the generally equally spaced articles are adapted to be arranged on said second conveyor spaced apart a distance which is greater than the spacing of the remaining articles on the second conveyor after transfer; and said at least two pusher members spaced apart the predetermined distance greater than the spacing of said equally spaced pusher members defining a leading pusher member and a trailing pusher member, said leading pusher member being spaced apart from an adjacent one of said equally spaced pusher members by a predetermined distance which is less than the spacing of said equally spaced pusher members.

2. The apparatus of claim 1 wherein said endless carrier means includes a chain carried by at least two sprockets provided on either side of said first conveyor.

3. The apparatus of claim 1 wherein at least two of said pusher members of said endless carrier means are spaced apart a predetermined distance which is less than the spacing of said equally spaced pusher members.

4. The apparatus of claim 1 wherein said endless conveyor means includes a predetermined number of said pusher members, each of said pusher members having a first wall oriented generally perpendicular to a machine direction of the endless carrier means and a second wall oriented generally parallel to a machine direction of the endless carrier means, and said trailing pusher member being spaced apart from an adjacent one of said equally spaced pusher members by a predetermined distance which is less than the spacing of said equally spaced pusher members.

5. The apparatus of claim 4 wherein said second wall of said leading pusher member is oriented at an acute angle with respect to the endless carrier means.

6. The apparatus of claim 5 wherein the first wall of each of the predetermined number of said pusher members is oriented perpendicularly to the second wall of each of the predetermined number of said pusher members.

7. Apparatus for transferring a series of generally equally spaced articles from a first conveyor onto a second conveyor oriented generally perpendicularly to the first conveyor, comprising:

endless carrier means for urging said articles from said first conveyor onto said second conveyor, said endless carrier means including a plurality of equally spaced pusher members, said endless carrier means also including at least two pusher members spaced apart a predetermined distance which is greater than the spacing of said equally spaced pusher members;

each of said plurality of equally spaced pusher member being oriented at a first predetermined angle with respect to the endless carrier means; and at least one of said pusher members of said endless carrier means being oriented at a second predetermined angle with respect to the endless carrier means, said second predetermined angle being different than said first predetermined angle.

8. A method for transferring a series of generally equally spaced articles from a first conveyor onto a second conveyor oriented generally perpendicularly to the first conveyor, comprising the steps of:

engaging a first one of said articles with a leading pushing member;

engaging a second one of said articles with a second pushing member adjacent to said leading pushing member with a first predetermined spacing provided between said leading pushing member and said second pushing member;

sequentially engaging each of a predetermined number of said articles with one of a predetermined plurality of pushing members with a second predetermined spacing provided between adjacent ones of said plurality of pushing members, said second predetermined spacing being larger than said first predetermined spacing;

engaging another of said articles with a trailing pushing member with a third predetermined spacing provided between said trailing pushing member and the next adjacent leading pushing member, said third predetermined spacing being larger than said second predetermined spacing; and sequentially releasing said engaged articles onto said second conveyor so as to provide a spacing between adjacent ones of said articles corresponding to the spacing between adjacent ones of said pushing members.

9. The method of claim 8 wherein said trailing pushing member is adjacent to a preceding pushing member with a fourth predetermined spacing, said fourth predetermined spacing being smaller than said second predetermined spacing.

* * * * *